May 1, 1951            R. L. CRAVEN            2,551,365
POLYMERIZATION OF FORMALDEHYDE TO PARAFORMALDEHYDE
WITH ALKALINE CATALYST
Filed March 31, 1949
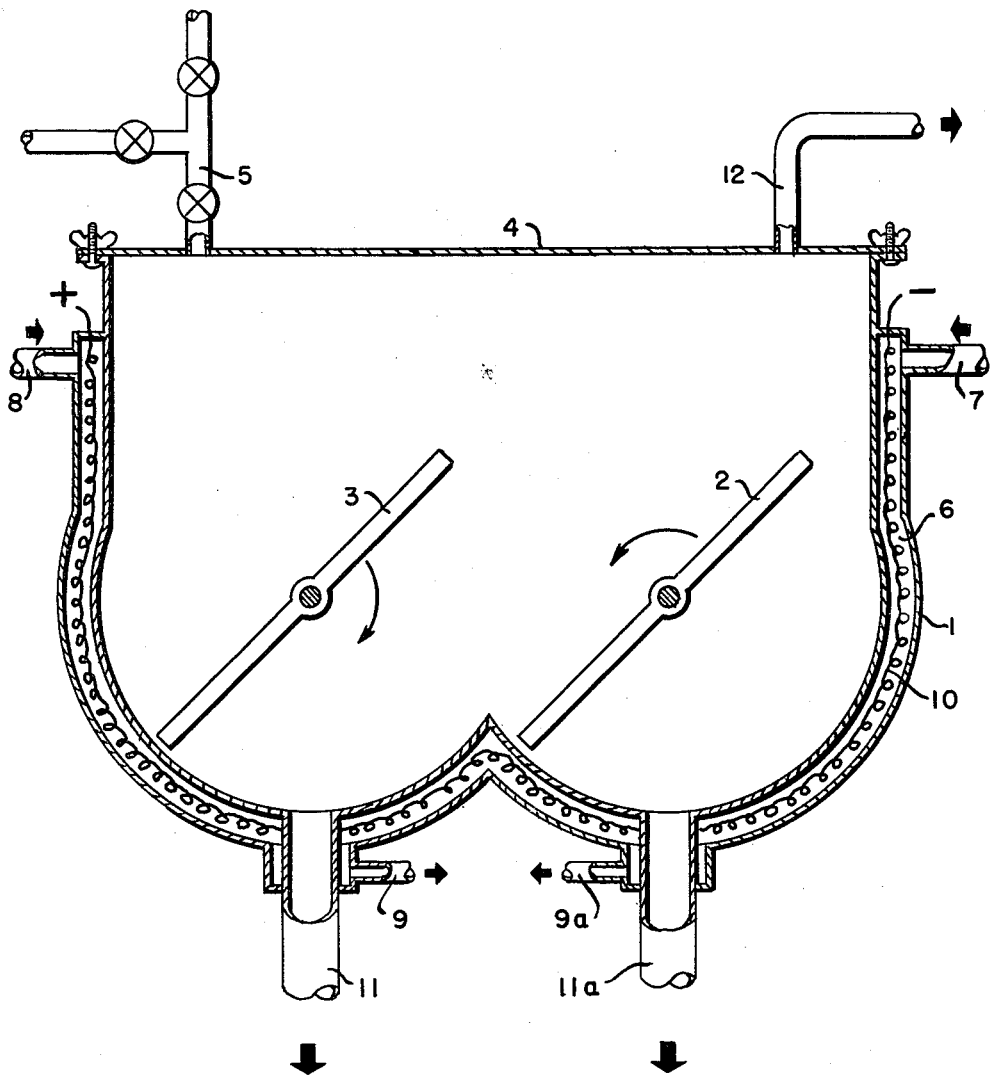
Robert L. Craven
INVENTOR.
BY
ATTORNEY Patented May 1, 1951

2,551,365

UNITED STATES PATENT OFFICE 2,551,365

POLYMERIZATION OF FORMALDEHYDE TO PARAFORMALDEHYDE WITH ALKALINE CATALYST

Robert L. Craven, Westfield, N. J., assignor to E. I. du Pont de Nemours & Company, Wilmington, Del., a corporation of Delaware Application March 31, 1949, Serial No. 84,651

7 Claims. (Cl. 260—340)

This invention relates to a new and improved process for the production of formaldehyde polymers. More particularly it relates to a process whereby high strength aqueous formaldehyde solutions can be concentrated to paraformaldehyde at a greatly accelerated rate.

The production of paraformaldehyde, on a commercial basis, is usually carried out by the vacuum evaporation of aqueous solutions of formaldehyde. Formaldehyde solutions of 30% to 50% are placed in a receptacle provided with stirring means and means to place the contents of the receptacle under sub-atmospheric pressure; usually a pressure of between 25 and 600 mm. Hg. With continuous stirring under vacuum, the solution gradually loses water and the formaldehyde and polyoxymethylene glycol molecules condense to form solid paraformaldehyde (93% to 97% formaldehyde). By this well-known process, when the concentration has reached about 80% to 85% formaldehyde, sufficient formaldehyde polymer has precipitated to form a paste which has a very poor heat transfer coefficient, and it requires a further period of heating of about four to six hours to evaporate the remaining water to yield a powdered polymer of about 95% formaldehyde concentration.

It is an object of this invention to provide a process for more rapidly removing the water from highly concentrated aqueous formaldehyde solutions to convert the same to paraformaldehyde.

It is another object of this invention to provide a simplified process for the production of paraformaldehyde of very high formaldehyde concentration (98%—99%) formaldehyde). Such polymers are also known as polyoxymethylenes.

It is still another object of this invention to provide a process whereby aqueous formaldehyde solutions of between 75% and 90% formaldehyde concentration can be rapidly concentrated to solid paraformaldehyde (95% to 99% formaldehyde concentration).

Other objects of the invention will appear hereinafter.

The objects of this invention may be accomplished by adding 0.01% to 1.0% by weight of an alkaline catalyst taken from the group consisting of sodium and potassium formates, carbonates, hydroxides, and acetates to an aqueous solution of formaldehyde having a concentration of between 75% and 90% formaldehyde at a temperature between 80° C. and 110° C. and subjecting the admixture to agitation until powdered paraformaldehyde of the desired formaldehyde concentration is obtained.

The process is preferably carried out in the following manner:

A 75% to 90%, preferably 80% to 85%, aqueous solution of formaldehyde is obtained or prepared in any desired manner. For example, a weaker aqueous solution of formaldehyde may be concentrated by vacuum evaporation in the conventional manner until the concentration of 75% to 90% has been reached. This concentrated formaldehyde solution should have a temperature of between 80° C. and 110° C. If necessary, external heating may be applied. Between 0.01% and 1.0%, preferably between 0.03% and 0.1% of the alkaline catalyst is then added, with agitation, to the hot concentrated formaldehyde solution in a receptacle. The alkaline catalyst may be added in powdered solid form or in solution, e. g., an aqueous or alcoholic solution. Such solution may have a strength of 5% to saturation of the alkaline material. A 20% to 50% aqueous solution of the alkaline material is preferred.

The concentrated formaldehyde solution containing the alkaline catalyst should be agitated by stirring, vibration, passing an inert gas therethrough, or in any other desired manner. The mass is then allowed to react for a short period of time, e. g., one to thirty minutes, to obtain a dry polymer. This process may be operated at atmospheric pressure or at a sub-atmospheric pressure. If the process is operated at a sub-atmospheric pressure, vacuum may be applied to the receptacle during the addition of the catalyst, or as soon as the catalyst is added to the formaldehyde solution. A vacuum of less than 600 mm. Hg., e. g., 25 mm. to 600 mm. Hg. is preferably applied to the receptacle for a period of a minute to one-half hour, after which a dry, powdered paraformaldehyde of 95% to 97% formaldehyde concentration is obtained. By heating under vacuum for an additional one-half hour to one hour, a paraformaldehyde of unusually high formaldehyde concentration (98% to 99% formaldehyde) is obtained.

The accompanying diagrammatic illustration shows one embodiment of apparatus suitable for use in carrying out the process of this invention.

In the drawing, reference numeral 1 designates generally a kneading machine comprising a pair of kneading rolls 2 and 3, a tightly fitting lid 4, an inlet pipe 5 for the formaldehyde solution to be concentrated, outlet pipes 11 and 11a for powdered paraformaldehyde, and a heating jacket 6.

The heating jacket may be maintained at a given temperature by passing a hot fluid through the jacket by means of inlet pipes 7 and 8 and outlet pipes 9 and 9a. The jacket may alternatively or supplementarily be heated by means of an electrical heating coil 10.

An outlet line 12 for water vapor is provided, as shown, in lid 4, through which water vapor and some formaldehyde gas is removed during the evaporation process. Vacuum line 12 may be connected to a conventional formaldehyde absorption system containing a vacuum pump if a vacuum is desired. Formaldehyde gases which are withdrawn through line 12 may thus be recovered.

The above-described apparatus may be operated as follows:

An aqueous solution of formaldehyde of any concentration is passed into the kneader through pipe 5. The kneading rolls 2 and 3 during preliminary concentration need not be operated. If an absorption system including a vacuum pump is provided, this will then be placed in operation. Steam or other heating medium is passed through the jacket in sufficient amount to maintain the temperature between 40° C. and 80° C. As the water and gaseous formaldehyde are withdrawn from the kneader, the solution therein becomes more concentrated. After the concentration of the aqueous formaldehyde in the kneader reaches a concentration of 75% to 90% of formaldehyde, the temperature is adjusted to between 80° C. and 110° C. and the alkaline catalyst is then added through pipe 5 and the kneading rolls placed in rotation. A vigorous exothermic polymerization reaction sets up. If the formaldehyde composition in the kneader has a concentration of 87% to 90% at the time of the addition of the alkaline catalyst, sufficient water will be removed in twenty to sixty seconds to yield dry powdered paraformaldehyde of 93% to 94% formaldehyde. Under these conditions a vacuum need not be applied. If the concentration of the formaldehyde at the time of catalyst addition is as low as 75%, three to three and one-half hours of kneading and heating under a sub-atmospheric pressure of 600 mm. Hg. or less may be necessary to remove sufficient water to form paraformaldehyde.

Additional heating under vacuum of the powdered paraformaldehyde in the kneader will produce paraformaldehyde having a formaldehyde content of 98% to 99% in fifteen minutes to one hour.

The process of this invention is substantially inoperative if the alkaline catalyst is added to aqueous formaldehyde compositions in which the formaldehyde has a concentration substantially less than 75%. As pointed out above, in the absence of any alkaline catalyst the time necessary to reduce the water content of 85% aqueous formaldehyde to produce 95% paraformaldehyde at a given vacuum is about four to six hours. With 80% to 85% aqueous formaldehyde, the addition of 0.01% to 1.0% of the alkaline catalyst, at the same vacuum, will reduce the time to produce 95% paraformaldehyde to about one-half hour. However, when the alkaline catalyst is added to 75% aqueous formaldehyde under the same conditions, the time necessary to reduce the water content sufficiently to produce 95% paraformaldehyde is three to three and one-half hours.

The concentrated aqueous formaldehyde (75% to 90%) should have a temperature of 80° C. to 110° C. before addition of the alkaline catalyst. The solution may be heated to this temperature in any desired manner, for example, by means of a heating jacket or heating coil as illustrated. The higher the temperature the faster the rate of the polymerization reaction. Temperatures ranging from just above the solidification point to the boiling point are satisfactory (80° C. to 110° C., respectively). Variation of the temperature offers an effective method for controlling the reaction.

The above-described alkaline catalysts are effective in concentrations of 0.01% to 1.0% (based on the weight of formaldehyde present) with the rate of condensation increasing substantially with an increase in concentration. The preferred concentration range of 0.03% to 0.1% produces a rapid reaction without introducing undue amounts of ash into the polymer. Because this reaction is so rapid with 87% to 90% formaldehyde, greater concentrations of alkali do not appear advisable for safe operation. However, as the concentration of formaldehyde decreases, approaching 75%, the addition of more catalyst will increase the rate of reaction. The alkaline catalyst may be added as a solid or in either aqueous or alcoholic solution. When solid sodium hydroxide was used, the local high concentration of catalyst appeared to catalyze the formation of polymer which formed a film around the solid and decreased its rate of solution and the overall rate of reaction. Catalyst in methanol solution was less effective than a corresponding amount of catalyst in water. This may be due to the reaction of methanol with the hydroxy end groups of the polymer chains to form methyl ether radicals which act as chain terminators in the polymerization reaction.

The following examples are given to illustrate the details of the invention, it being understood that the specific details in the examples are not to be taken as any limitation of the scope of the invention.

*Example I*

12,890 grams of an aqueous solution of formaldehyde containing 43.1% formaldehyde were charged to a stainless steel kneader equipped with a condenser. The solution was then concentrated to 88% formaldehyde content with a vacuum of about 560 mm. Hg. As a result of the vacuum concentration, the solution became heated to a temperature of 90° C. 25 grams of a 33% aqueous sodium hydroxide solution (0.15% NaOH based on 100% formaldehyde in the solution charged) were then added at atmospheric pressure. An extremely vigorous reaction occurred, causing the mass to solidify in the form of a powder, and the concentration of formaldehyde in the mass increased to 92% in one minute. Application of vacuum of about 560 mm. Hg. for one and one-half hours increased the concentration to 98.3%.

*Example II*

10,655 grams of an aqueous solution of formaldehyde containing 43.4% formaldehyde were charged to the kneader used in Example I. The solution was vacuum concentrated to about 87% formaldehyde. The vacuum was released and the concentrated solution heated to boiling (about 108° C.). 7.2 grams of 25% sodium hydroxide solution were then added (0.03% NaOH based on 100% formaldehyde). In one minute the concentration was raised to 94.2% formaldehyde and a powder was obtained. The powder was heated 15 minutes under vacuum to increase the concentration to 98.2%.

Example III

Approximately 3,600 pounds of an aqueous solution of formaldehyde containing 44% formaldehyde were concentrated to 82.1% formaldehyde in an ordinary reaction vessel, and then charged to a large, stainless steel kneader at about 87° C. Four pounds of a 25% sodium hydroxide solution were then added (0.06% of 100% formaldehyde charged). After about ten minutes reaction at atmospheric pressure, vacuum was slowly applied until the pressure was less than 100 mm. Hg. After 15 minutes, the material had been dried to a powder. The powder was kept under vacuum an additional half-hour to obtain a product having a formaldehyde concentration of 98.2%.

Example IV 9,585 grams of an aqueous solution of formaldehyde containing 51.2% formaldehyde were charged to the stainless steel kneader used in Example I. The solution was vacuum concentrated at a vacuum of about 560 mm. Hg. to 85.9% formaldehyde content, the vacuum released and the solution heated to boiling (about 106° C.). Twelve (12) grams of a 25% aqueous potassium hydroxide solution were added. In twenty seconds, a powdered product was obtained which, after heating in a vacuum of about 560 mm. Hg. for 15 minutes, had a formaldehyde concentration of 98.1%.

Example V 8,720 grams of an aqueous solution of formaldehyde containing 44% formaldehyde were charged to the stainless steel kneader used in Example I. The solution was vacuum concentrated at a vacuum of about 560 mm. Hg. to 87.9% formaldehyde content, the vacuum released, and the solution heated to boiling (109.6° C.). The top of the kneader was removed and an exhaust duct drawn down to within a foot of the top of the kneader. Eight (8) grams of 25% aqueous sodium hydroxide were then added with agitation. A vigorous reaction started immediately and in ten seconds a moist powder of 91.2% formaldehyde was obtained. In ten minutes the powder had dried to 96%.

Example VI

The following example demonstrates that an alkaline catalyst is not effective to rapidly condense and remove water from formaldehyde solutions having concentrations below 75%.

12,270 grams of an aqueous solution of formaldehyde containing 40.4% formaldehyde were charged to the stainless steel kneader used in Example I. The solution was vacuum concentrated to 67% formaldehyde content. To this solution whose temperature was about 80° C., 41.8 grams of 33% sodium hydroxide solution (0.28% based on formaldehyde) were added. The solution became cloudy as polymer slowly precipitated, until a paste was formed. This paste was converted to a powder as in the normal paraformaldehyde process requiring about five hours.

The process of this invention offers two advantages in the production of paraformaldehyde. (1) Reduction in time required for converting concentrated formaldehyde to solid paraformaldehyde (95% to 97%); and (2) a process for the production of high strength polymers (98% to 99%). The process of this invention reduces concentration time substantially and thus increases the rate of production.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

I claim:

1. The process for the production of paraformaldehyde which comprises adding to an aqueous formaldehyde having a concentration of 75% to 90% formaldehyde and having a temperature of 80° C. to 110° C., 0.01% to 1.0% of an alkaline catalyst taken from the group consisting of sodium and potassium hydroxides, carbonates, formates, and acetates, and agitating the resulting composition.

2. The process for the production of paraformaldehyde which comprises adding to an aqueous formaldehyde having a concentration of 75% to 90% formaldehyde and having a temperature of 80° C. to 110° C., 0.01% to 1.0% of an alkaline catalyst taken from the group consisting of sodium and potassium hydroxides, carbonates, formates, and acetates, and agitating the resulting composition at a sub-atmospheric pressure of less than 600 mm. Hg.

3. The process for the production of paraformaldehyde which comprises adding to an aqueous formaldehyde having a concentration of 80% to 85% formaldehyde and having a temperature of 80° C. to 110° C., 0.03% to 0.1% of an alkaline catalyst taken from the group consisting of sodium and potassium hydroxides, carbonates, formates, and acetates, and agitating the resulting composition.

4. The process for the production of paraformaldehyde which comprises adding to an aqueous formaldehyde having a concentration of 80% to 85% formaldehyde and having a temperature of 80° C. to 110 C., 0.03% to 0.1% of an alkaline catalyst taken from the group consisting of sodium and potassium hydroxides, carbonates, formates, and acetates, and agitating the resulting composition at a sub-atmospheric pressure of less than 600 mm. Hg.

5. The process for the production of paraformaldehyde which comprises adding to an aqueous formaldehyde having a concentration of 75% to 90% formaldehyde and having a temperature of 80° C. to 110° C., 0.01% to 1.0% of an alkaline catalyst taken from the group consisting of sodium and potassium hydroxides, carbonates, formates, and acetates, agitating the resulting composition at atmospheric pressure for a period of one to fifteen minutes, and then agitating the composition at a sub-atmospheric pressure of less than 600 mm. Hg.

6. The process for the production of paraformaldehyde which comprises adding to an aqueous formaldehyde having a concentration of 75% to 90% formaldehyde and having a temperature of 80° C. to 110° C., 0.01 to 1.0% of sodium hydroxide, and agitating the resulting composition.

7. The process for the production of paraformaldehyde which comprises adding to an aqueous formaldehyde having a concentration of 75% to 90% formaldehyde and having a temperature of 80° C. to 110° C., 0.01% to 1.0% of sodium hydroxide, and agitating the resulting composition at a sub-atmospheric pressure of less than 600 mm. Hg.

ROBERT L. CRAVEN.

REFERENCES CITED

The following references are of record in the file of this patent:

UNITED STATES PATENTS

| Number | Name | Date |
|---|---|---|
| 1,905,290 | Horsley | Apr. 25, 1933 |
| 2,267,290 | Somerville | Dec. 23, 1941 |
| 2,318,341 | Thompson | May 4, 1943 |

FOREIGN PATENTS

| Number | Country | Date |
|---|---|---|
| 303,258 | Great Britain | Jan. 3, 1929 |